(12) United States Patent
Gache et al.

(10) Patent No.: US 11,054,641 B2
(45) Date of Patent: Jul. 6, 2021

(54) IMAGE GENERATING DEVICE FOR SCREEN AND HEAD-UP DISPLAY

(71) Applicant: VALEO COMFORT AND DRIVING ASSISTANCE, Créteil (FR)

(72) Inventors: Stéphane Gache, Créteil (FR); Bruno Albesa, Créteil (FR); Gérard Guenin, Créteil (FR); Alexandre Camenen, Créteil (FR); Jean-David Lafferayrie, Créteil (FR); Pierre Mermillod, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 16/323,125

(22) PCT Filed: Aug. 3, 2017

(86) PCT No.: PCT/EP2017/069752
§ 371 (c)(1),
(2) Date: Apr. 18, 2019

(87) PCT Pub. No.: WO2018/024864
PCT Pub. Date: Feb. 8, 2018

(65) Prior Publication Data
US 2019/0250403 A1 Aug. 15, 2019

(30) Foreign Application Priority Data
Aug. 3, 2016 (FR) ....................................... 1601197

(51) Int. Cl.
*G02B 27/01* (2006.01)
*H04N 13/305* (2018.01)
(Continued)

(52) U.S. Cl.
CPC .......... *G02B 27/0101* (2013.01); *B60K 35/00* (2013.01); *G02B 30/27* (2020.01);
(Continued)

(58) Field of Classification Search
CPC ................ G02B 27/01; G02B 27/0101; G02B 2027/014; G02B 2027/0138; G02B 27/017
See application file for complete search history.

(56) References Cited

U.S. PATENT DOCUMENTS

| | | | | |
|---|---|---|---|---|
| 5,379,132 A | * | 1/1995 | Kuwayama | ............ G02B 3/005 345/7 |
| 6,302,541 B1 | * | 10/2001 | Grossmann | .......... H04N 13/324 351/240 |

(Continued)

FOREIGN PATENT DOCUMENTS

| | | |
|---|---|---|
| WO | 2005045488 A1 | 5/2005 |
| WO | 2015044135 A2 | 4/2015 |

OTHER PUBLICATIONS

International Search Report and Written Opinion Issued in Corresponding PCT Application No. PCT/EP2017/069752, dated Sep. 15, 2017 (11 Pages with English Translation of Insternational Search Report).

*Primary Examiner* — Olga V Merkoulova
(74) *Attorney, Agent, or Firm* — Osha Bergman Watanabe & Burton LLP

(57) ABSTRACT

The invention relates to an image generating device (11), comprising: —a light source (12), —a light modulator (13) or a diffuser adapted to display an image on an output face side, and—an auto-stereoscopic filter (14) of which an input face is turned towards the output face of the light modulator or the diffuser. According to the invention, the auto-stereoscopic filter extends opposite only a portion of the output (Continued)

face, and an image plane offset panel (15) is provided, which is located only opposite the remaining portion of the output face.

15 Claims, 2 Drawing Sheets

(51) Int. Cl.
    *H04N 13/324*      (2018.01)
    *G02B 30/27*      (2020.01)
    *B60K 35/00*      (2006.01)

(52) U.S. Cl.
    CPC ......... *H04N 13/305* (2018.05); *H04N 13/324* (2018.05); *B60K 2370/1529* (2019.05); *G02B 2027/0127* (2013.01); *G02B 2027/0134* (2013.01)

(56) References Cited

U.S. PATENT DOCUMENTS

| | | | |
|---|---|---|---|
| 6,373,472 B1 * | 4/2002 | Palalau | B60K 37/02 345/173 |
| 6,856,462 B1 * | 2/2005 | Scarbrough | G02B 27/10 359/619 |
| 10,178,376 B2 * | 1/2019 | Ward | H04N 13/31 |
| 2007/0091638 A1 * | 4/2007 | Ijzerman | G02F 1/133615 362/611 |
| 2008/0211779 A1 * | 9/2008 | Pryor | G01C 21/3664 345/173 |
| 2008/0259156 A1 * | 10/2008 | Zhang | G02B 30/24 348/51 |
| 2012/0062991 A1 * | 3/2012 | Krijn | H04N 13/305 359/463 |
| 2012/0172119 A1 * | 7/2012 | Kelly | A63F 13/00 463/31 |
| 2012/0223941 A1 * | 9/2012 | Sekine | H04N 13/324 345/419 |
| 2013/0257828 A1 * | 10/2013 | Azuma | G02F 1/29 345/204 |
| 2014/0111741 A1 * | 4/2014 | Han | G02B 5/0257 349/62 |
| 2015/0334378 A1 * | 11/2015 | Ward | H04N 13/31 348/59 |
| 2016/0234487 A1 * | 8/2016 | Kroon | H04N 13/317 |
| 2018/0147985 A1 * | 5/2018 | Brown | G03B 21/20 |
| 2019/0096121 A1 * | 3/2019 | Kang | G02B 30/27 |

* cited by examiner

IMAGE GENERATING DEVICE FOR SCREEN AND HEAD-UP DISPLAY

TECHNICAL FIELD TO WHICH THE INVENTION IS RELATED

The present invention generally relates to motor vehicle driving aids.

It relates more particularly to an image generating device, comprising:
 a light source,
 a display panel illuminated by the light source and comprising an output face on which an image may be displayed, and
 an autostereoscopic filter an input face of which is turned toward the output face of the display panel.

It also relates to head-up displays and display screens provided with such an image generating device.

TECHNOLOGICAL BACKGROUND

For making it easier and safer to drive a motor vehicle, it is desirable to avoid the driver being forced to look away from the road that they are traveling.

For this, it is known to use a head-up display, suitable for projecting information (vehicle speed, direction to follow, etc.) at the eye level of the driver.

Various types of head-up display technologies are known, one of which uses a screen to generate an image, which is then projected into the driver's field of vision by means of a set of mirrors and combiner. The combiner notably helps ensure that the driver can see the information superimposed on the view that they have of the road.

With this head-up display technology, the driver sees the information as if it were displayed in a plane located at a given distance from the driver, a distance which is generally greater than that between the driver and the windshield. The image is therefore seen as being two-dimensional (that is, a 2D image).

Another technology consists in combining a microlens array with the screen, helping to ensure that the driver sees two different images with their two eyes.

With this head-up display technology, the driver's brain may interpret these two images as forming a single or even three-dimensional image (that is, a 3D image).

The major drawback of this technology is that it reduces the definition of the screen, in the sense that each point of the image seen by the driver is developed by means of a plurality of pixels on the screen.

A head-up display is also known comprising two screens making it possible to display two images, and a polarizing filter which extends between the two screens and allows the two images to be sent back to the combiner. One of these screens comprises a microlens array for generating three-dimensional images, while the other does not.

This head-up display thus makes it possible to benefit from the display of a 3D image and a 2D image in high definition. However, it has three major drawbacks, namely a high cost due to the use of two screens, a considerable size and significant weight.

SUBJECT MATTER OF THE INVENTION

In order to remedy the aforementioned drawbacks of the prior art, the present invention provides an inexpensive device for generating images, capable of displaying 3D images, and benefiting from a good resolution in at least one portion of the image seen by the driver.

More particularly, the invention provides an image generating device as defined in the introduction, wherein the autostereoscopic filter extends opposite only a portion of the output face of the display panel, and wherein an image plane offset panel is provided which is located only opposite the remaining portion of the output face of the display panel.

Thus, thanks to the invention, one portion of the screen is used to display a 3D image, and another portion of the screen is used to display a 2D image, with increased definition.

The use of a single device (in practice one screen) thus makes it possible to reduce costs while enjoying the advantages of 2D and 3D images.

The image plane offset panel helps compensate for the displacement of the image plane caused by the thickness of the autostereoscopic filter. In this way, the images seen in two dimensions and three dimensions have identical sharpness.

Other advantageous and non-restrictive features of the image generating device compliant with the invention are as follows:
 the image plane offset panel is a fiber optic panel;
 the image plane offset panel is located in contact with the output face of the display panel;
 the autostereoscopic filter is located remotely from the output face of the display panel;
 the autostereoscopic filter comprises a microlens array;
 the image plane offset panel has a thickness which depends on the characteristics of the autostereoscopic filter;
 the image plane offset panel has a thickness which depends on the focal length of the microlens array;
 the light source is a scanning unit and the display panel is a diffuser an input face of which is illuminated by said scanning unit;
 the display panel is a light modulator which is suitable for spatially modulating the light emitted by the light source; and
 the light modulator comprises a transmissive screen an input face of which is turned toward the light source.

The invention also provides a display screen for a motor vehicle passenger compartment, comprising:
 an open frame at the front,
 an image generating device as mentioned above, set in the frame,
 a computer suitable for controlling the image generating device so that it generates an image, and
 a protective screen of said image generating device, which closes the front opening of the frame.

The invention also provides a head-up display for a motor vehicle comprising:
 an image generating device as mentioned above,
 a computer suitable for controlling the image generating device so that it generates an image, and
 a projection system suitable for projecting said image into the field of vision of the driver of the motor vehicle.

Advantageously, said projection system comprises at least one optical magnification component.

Also advantageously, said projection system comprises a combiner in the form of a transparent and partially reflective optical glass. As a variant, the windshield may act as a combiner, taking advantage of the fact that it is partially reflective.

DETAILED DESCRIPTION OF AN EMBODIMENT

The following description with reference to the appended drawings, given by way of non-restrictive examples, will elucidate what form the invention takes and how it may be implemented.

In the appended drawings:

FIG. 1 depicts a head-up display 10 intended to be fitted in a vehicle, e.g. a motor vehicle.

Figure 1:
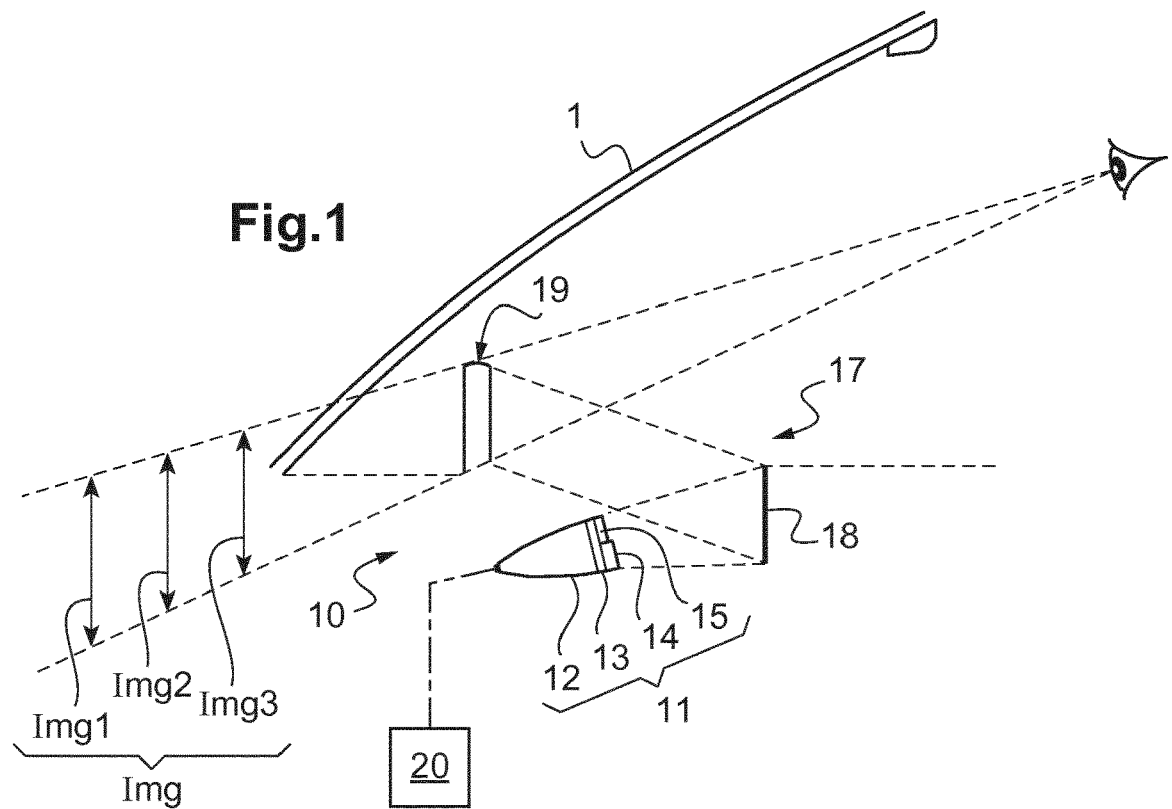
FIG. 1 is a schematic view of a head-up display compliant with the invention.

This head-up display 10 comprises an image generating device 11 controlled by a computer 20, and an optical projection system 17.

In practice, the image generating device 11 comprises a light source 12 and a display panel where the images are formed. In the embodiment considered here, the display panel is formed by a light modulator 13 which is suitable for spatially modulating the light emitted by the light source 12 for displaying an image.

In the embodiment illustrated in FIG. 1 the light modulator 13 is of the "transmissive" kind: it comprises a transmissive display screen 13 and the light source 12 is suitable for backlighting this screen.

As a variant, as will be described below, the light modulator could be of the "reflective" kind.

The light source 12 is here formed by a coplanar array of light-emitting diodes, which are carried by a printed circuit.

Figure 2:
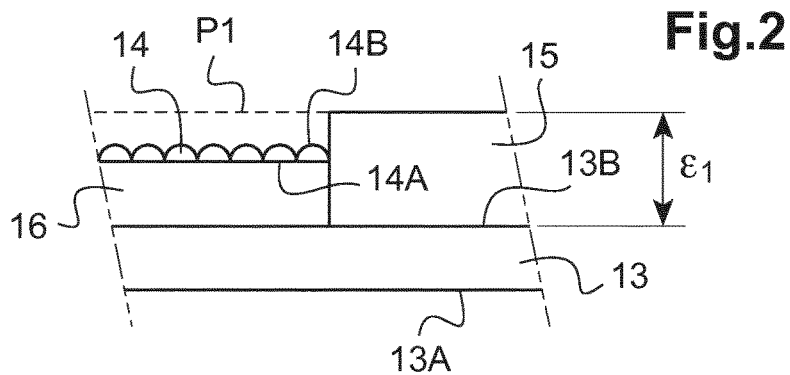
FIGS. 2 and 3 are schematic sectional views of a portion of the screen, the autostereoscopic filter and the image plane offset panel of the head-up display in FIG. 1.
Figure 3:
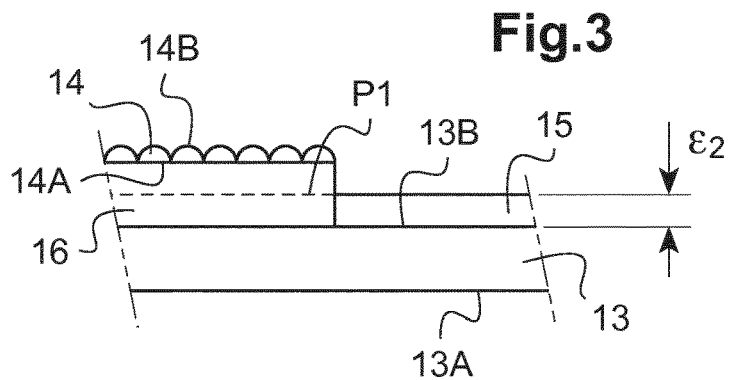

The display screen 13 is here a thin film transistor (TFT) liquid crystal display (LCD) screen. As depicted in FIGS. 2 and 3, it has an input face 13A which is flat, parallel to the plane of the light-emitting diode array, and turned toward these light-emitting diodes. It also has an opposite output face 13B, which is flat and via which the image may be observed.

As depicted in FIG. 1, this display screen 13 makes it possible, under the control of the computer 20, to generate an image that the optical projection system 17 will be able to project into the driver's field of vision when the driver is looking toward the road.

This optical projection system 17 is more specifically designed to project a virtual image Img into the field of vision of the vehicle's driver.

It comprises for this purpose an optical return system 18 and a combiner 19 placed in the field of vision of the vehicle's driver. It could optionally also comprise a magnifying lens (not represented).

The optical return system 18, which here comprises only one folding mirror, is used to send back the image generated by the image generating device 11 to the combiner 19.

The combiner 19 is used to reflect this image so that it appears to the driver.

Here, this combiner 19 is preferably arranged in the passenger compartment of the motor vehicle, between the windshield 1 of the vehicle and the driver's eyes. As a variant, the combiner could be formed by the windshield itself.

This combiner 19 comprises a transparent curved and semi-reflective optical glass acting as a magnifier. Here, it is an injected part made of polycarbonate, which is curved so as to enlarge the size of the virtual image Img seen by the driver.

The computer 20 comprises a processor and a storage unit, e.g. a rewritable non-volatile memory or a hard disk.

The storage unit notably stores a computer application, consisting of computer programs comprising instructions the execution of which by the processor is used to control the image generating device 11 so that the driver may see information displayed through the combiner 19.

Here, and it is more specifically the subject matter of the present invention, the head-up display 10 is designed so that the virtual images Img projected into the driver's field of vision are seen by the driver as partially three-dimensional. These images are more specifically provided for being viewed in three dimensions by the driver, without the need to wear stereoscopic glasses (better known as "3D glasses").

For this, according to a particularly advantageous feature of the invention, the image generating device 11 comprises:

an autostereoscopic filter 14, an input face 14A of which is turned toward the output face 13B of the display screen 13, and which extends opposite only a portion of the output face 13B of the display screen 13, and an image plane offset panel 15 which is located opposite only the remaining portion of the output face 13B of the display screen 13.

In other words, the autostereoscopic filter 14 covers a portion of the display screen 13 and the image plane offset panel 15 at least partially covers the remaining portion of the display screen 13.

In this way, the image generated by the image generating device 11 comprises an area seen by the driver as being three-dimensional, and another area seen by the driver as being two-dimensional.

The computer 20 is then provided for controlling the display of images by the display screen 13, taking into account the characteristics of the autostereoscopic filter 14 and its position, so that the virtual images Img seen by the driver are sharp.

As depicted in FIGS. 2 and 3, the autostereoscopic filter 14 is overall in the form of a panel, with an input face 14A turned toward the output face side 13B of the display screen 13, and an output face 14B turned the opposite way, so that the image is observable.

This autostereoscopic filter 14 could be in the form of a parallax barrier.

Here, preferably, the autostereoscopic filter 14 is rather in the form of an array of convergent microlenses offering at least two distinct points of view.

"Distinct points of view", is understood to mean that the image generating device 11 is suitable for simultaneously displaying (in the 3D portion of the image) two different superposed two-dimensional images, each of which may be observed individually at an angle different from the angle at which the other image may be observed.

In this way, the driver will be able to simultaneously observe these two-dimensional images with both their eyes, so that their brain may reconstruct a three-dimensional image.

In a first embodiment, provision may be made for the number of points of view to be equal to two. In this embodiment, it will be ensured that the angle at which each point of view is observable is sufficiently large for the 3D portion of the image to remain observable when the driver's head is slightly offset with respect to the image.

In a preferred embodiment, the image generating device 11 will offer more than two points of view, e.g. eight points of view. In this way, the driver may observe two two-dimensional images with both their eyes, not only when their head is positioned exactly in the axis of the combiner 19, but also when it is offset with respect to this axis.

The number of points of view will, however, be chosen so as to remain restricted, so as not to overly degrade the definition of the 3D portion of the image.

This autostereoscopic filter 14 is located remotely from the output face 13B of the display screen 13.

An optically neutral element 16 is then interposed between the output face 13B of the display screen 13 and the input face 14A of the autostereoscopic filter 14, to act as a support for the latter. Here this is a simple glass panel, whereof the faces against which the autostereoscopic filter 14 and the display screen 13 are applied, are flat and parallel to each other.

The operation of the autostereoscopic filter 14 will be described in more detail below, with reference to FIGS. 4 and 5.

As explained above, the display screen 13 creates a two-dimensional image a 2D portion of which is provided for being directly observed (through the image plane offset panel 15) and a 3D portion of which is provided for being observed via the autostereoscopic filter 14.

It will be noted here that this autostereoscopic filter 14 does not create a three-dimensional image but it makes it possible to partition the 3D portion of the image so that the two eyes of the driver do not see the same thing and the driver's brain can reconstruct a three-dimensional image. Accordingly this disclosure uses linguistic simplification to refer to the 3D portion of the image. It is therefore also clear that the 3D portion of the image has an image plane (or "main image plane") in a similar way to the 2D portion of the image.

So that the 2D and 3D portions of the image are seen clearly by the driver, it is necessary that they are displayed in one and the same image plane located in the focal plane of the optical projection system 17.

However, as depicted in FIGS. 2 and 3, the microlens array of the autostereoscopic filter 14 has the effect of offsetting the image plane P1 of the 3D portion of the image in front of the image plane of the 2D portion of the image (which here coincides with the output face 13B of the display screen 13).

This is the reason why the image plane offset panel 15 is provided in front of the portion of the output face 13B of the display screen 13 which is not covered by the autostereoscopic filter 14.

Indeed this panel makes it possible to offset the image plane of the 2D portion of the image, initially located on the output face 13B of the display screen 13, in the image plane P1 of the 3D portion of the image.

In this way the whole of the image generated by the image generating device 11 is located in a single image plane P1.

Here, the image plane offset panel 15 is a fiber optic panel (better known as a "fiber optical taper"). Such a panel consists of a set of coherent (parallel) optical fibers accurately transmitting an image from its input face to its output surface. It therefore makes it possible to offset the image plane of the 2D portion of the image, initially located on the output face 13B of the display screen 13, in the image plane P1 of the 3D portion of the image.

One of the faces of this offset panel is located in contact with the output face 13B of the display screen 13, while its opposite face extends into the image plane P1.

It will be noted, as depicted in FIGS. 2 and 3, that this image plane P1 may be located in front (FIG. 2) at the level of or behind (FIG. 3) the microlens array according to the characteristics of the latter.

The image plane offset panel 15 will then have a thickness ε1, ε2 notably determined according to the focal length of the microlens array.

FIG. 1 represents the image generating device 11 as if the autostereoscopic filter 14 extended over a lower half of the display screen 13 and as if the image plane offset panel 15 extended over the remaining portion of the display screen 13.

In practice, the autostereoscopic filter 14 may be located over one or more well-located areas of the display screen 13, where it is desired to be able to display information in different planes from the plane in which the other information is displayed.

Thus, by way of example, the autostereoscopic filter 14 may extend over the whole of one edge of the display screen 13.

Figure 4:
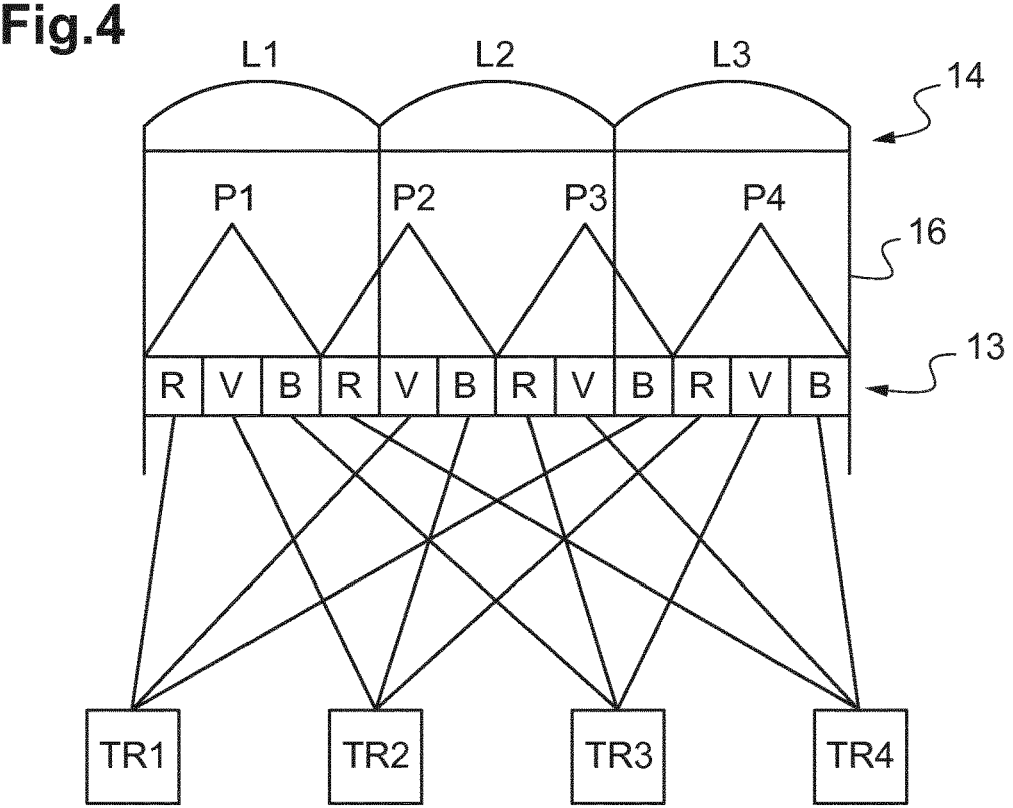
FIG. 4 is a schematic sectional view of a portion of the screen and the autostereoscopic filter of the head-up display in FIG. 1.
Figure 5:
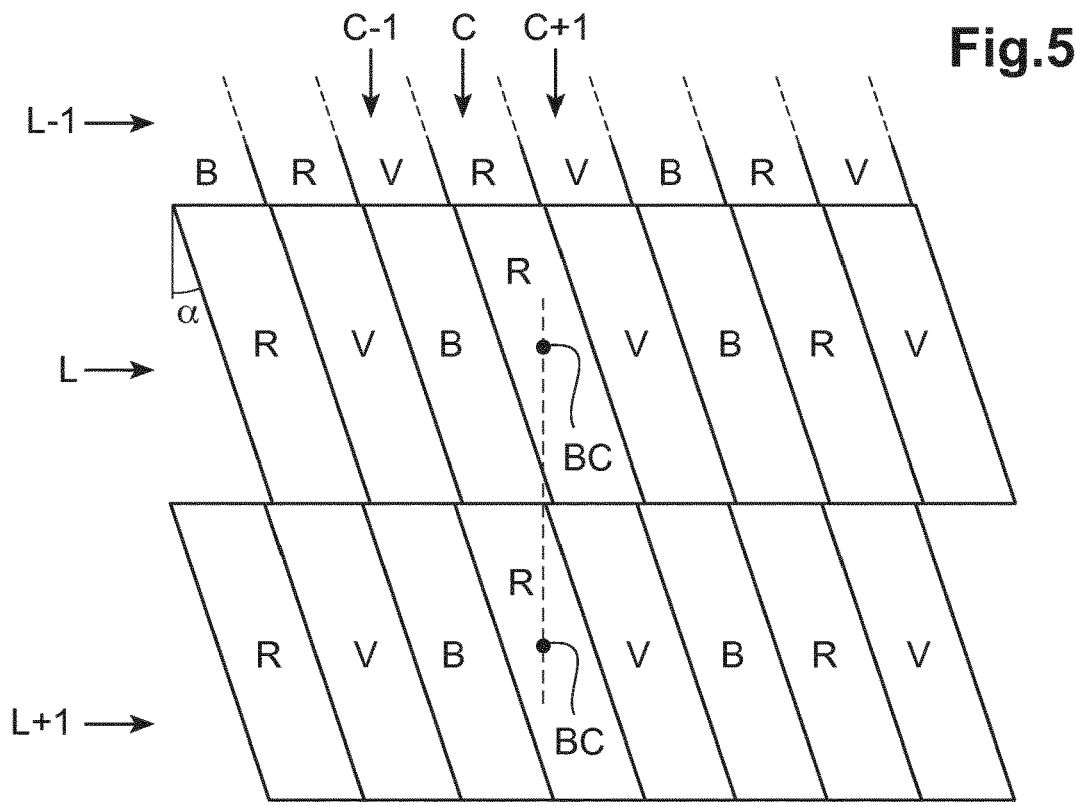
FIG. 5 is a schematic front view of a portion of the screen of the head-up display in FIG. 1.

A more detailed description may now be given, with reference to FIGS. 4 and 5, of how the 3D portion of the image is developed.

For this, FIG. 4 very schematically represents, in section, a portion of the display screen 13 and the autostereoscopic filter 14.

It may be observed here that the display screen 13 comprises a periodic succession of different colored subpixels: Red (R), Green (V) and Blue (B). Each subpixel triplet forms a pixel P1, P2, P3, P4.

Each subpixel has, in front view, a rectangular shape or, as will be described below, a parallelogram shape.

Each subpixel is controlled by the computer 20 for transmitting light to the autostereoscopic filter 14 with a determined light intensity, the apparent color then resulting from the mixture of the three primary colors in the eye of the driver.

The autostereoscopic filter 14 is composed of "cylindrical" microlenses L1, L2, L3. In practice these are lenses profiled along a vertical axis, with convex cross-sections. In the example illustrated in the figures, these lenses have a flat rear face (facing the display screen 13) and a convex front face. As a variant, this could be otherwise.

The microlens array is placed in front of a portion of the display screen 13, parallel thereto, at a distance equal to the focal length of the microlenses. In this way, the microlenses L1, L2, L3 of the array magnify the points horizontally and they reflect the visual information present on the screen to infinity.

In the embodiment in FIG. 4, for reasons of clarity, an image generating device 11 is represented which offers a number of points of view TR1, TR2, TR3, TR4 equal to 4.

Four pixels P1, P2, P3, P4 are represented in this figure juxtaposed horizontally.

Three microlenses L1, L2, L3 are also represented. The interval between these microlenses L1, L2, L3 is here chosen to be equal to the width (taken horizontally) of four subpixels.

The four points of view TR1, TR2, TR3, TR4 are also represented from which it is possible to observe the image generating device 11. For clarity in FIG. 4, these four points of view are represented on the side of the display screen 13 while in practice, this screen will be seen from the opposite side.

One (single) eye observing the display screen 13 through the microlens array 14 will then see, depending on its position:

either the juxtaposition of the red component R of the pixel P1, the green component V of the pixel P2 and the blue component B of the pixel P3 (point of view TR1), or the juxtaposition of the green component V of the pixel P1, the blue component B of the pixel P2 and the red component R of the pixel P4 (point of view TR2), or the juxtaposition of the blue component B of the pixel P1, the red component R of the pixel P3 and the green component V of the pixel P4 (point of view TR3), or finally the juxtaposition of the red component R of the pixel P2, the green component V of the pixel P3 and the blue component B of the pixel P4 (point of view TR4).

In other words, each of the driver's eyes is liable to visually mix the red, green and blue components of different pixels in the image.

In this way, by cleverly controlling the light intensity emitted by each subpixel, the computer can display images which, because they will not be seen at the same angle (i.e. from the same point of view) by the two eyes of the driver, may be interpreted by the brain as three-dimensional images.

As has been explained above, the image generating device 11 will preferably be designed to offer the desired number "i" of points of view. For this, microlenses will be used that will each cover, not four, but "i" subpixels.

In a preferred embodiment of the invention, the microlenses will be elongated along a vertical axis but, as depicted in FIG. 5, the subpixels will be elongated along an inclined axis by an angle α with respect to the vertical axis.

In this embodiment, each subpixel has a parallelogram shape.

With respect to a subpixel that would be rectangular, the upper and lower short sides of each subpixel are displaced, respectively, to the left and to the right, and the long sides are inclined by an angle α which is here 18° 43 with respect to the vertical.

The relative displacement of the short sides is substantially equal to the width of a subpixel. Thus, the top short side of the (blue) subpixel of line "L" and column "C" is located opposite the bottom short side of the (green) subpixel of line "L−1" and column "C−1". Similarly, the bottom short side of the subpixel of line "L" and column "C" is located opposite the top short side of the (red) subpixel of line "L+1" and column "C+1".

In this way, the black lines vertically separating the subpixels become broken lines made up of small segments forming an angle of approximately 18° 43 with the vertical. Nevertheless, considering the centroids BC of the subpixels of the same color (e.g. red), it may be considered that they remain aligned along a vertical axis, as in the case of FIG. 1.

The usefulness of this system is twofold. First, it breaks up the vertical and continuous appearance of the inter-subpixel spaces, which might otherwise be visible up close. Secondly, it very significantly reduces artifacts such as moiré effects.

An example of using the image generating device 11 may now be described.

For this, first of all the "frontal planes" will be defined as the planes that extend substantially orthogonal to the direction of gaze of the driver. Each frontal plane will then be defined by a "depth", i.e. by a distance separating it from the driver's eyes.

As depicted in FIG. 1, the computer 20 controls the image generating device 11 so that each virtual image Img projected by the optical projection system 17 is seen by the driver as consisting of points located in a finite number of distinct frontal planes, this number being, for example, equal to three.

Each image Img will then be developed so that it comprises three portions (called "layer Img1, Img2, Img3") which will be interpreted by the driver's brain as being included in three distinct frontal planes.

Thus, the intermediate layer Img2 may be formed by the 2D portion of the image. It may notably make it possible to continuously display common information such as the speed of the vehicle or the direction to be followed.

The other two layers Img1, Img3 may be formed by the 3D portion of the image. They may notably be used to display information episodically. The most distant layer Img1 may thus be used to report obstacles, e.g. by displaying a red frame around each obstacle. The nearest layer Img3 to the driver may, for example, be used to report problems relating to the engine or to the traffic on the route taken.

The present invention is in no way restricted to the embodiment described and represented, but the person skilled in the art will know how to apply any variant thereto that is compliant with the invention.

Thus, provision could be made to use only a portion of the display screen for displaying information, in which case the image plane offset panel 15 and the autostereoscopic filter 14 may not cover the whole of the screen but only a portion thereof.

According to another variant, as explained above, the light modulator may be not a transmissive screen, but a reflective system. Such a reflective system may, for example, operate according to an LCOS (Liquid Crystal on Silicon) or DLP (Digital Light Processing) technology. In these two technologies, provision is made to use a set of "shutters", forming a kind of reflective panel. Each shutter is then designed to take two distinct states In order to reflect or not reflect the light toward the optical projection system 17.

As another variant, provision could be made that the image generating device is not of the "light modulation" type, but rather of the "emissive" type. It would then comprise a diffuser (the "display panel") and a scanning unit (the "light source") which would be controlled by a computer so as to generate a light beam of variable direction scanning the rear face of the diffuser. The scanning unit would specifically comprise a beamforming module and at least one movable mirror, e.g. in the form of a microelectromechanical system (MEMS). The beamforming module would typically include three sources of monochromatic light such as laser sources, the respective (monochromatic) light beams of which would be combined (e.g. with the aid of dichroic mirrors) in order to form a polychromatic light beam (here a laser) output from the beamforming module. This light beam generated by the beamforming module would be directed toward the movable mirror, the orientation of which would be controlled so that the reflected light beam (by the movable mirror) scans the rear face of the diffuser.

According to another variant of the invention, provision could be made to use the image generating device not in a head-up display but rather in a display screen located in the passenger compartment of a motor vehicle. This display screen would then comprise an open frame at the front provided with means for attaching to the vehicle, an image generating device as mentioned above set in the frame, a computer suitable for controlling said image generating device, and a protective screen (touch screen or otherwise) closing the front opening of the frame. This display screen could, for example, be incorporated into the dashboard of the vehicle, at the back of the steering wheel, or in the center console of the vehicle, between the driver's seat and the passenger's seat.

The invention claimed is:

1. An image generating device, comprising:
   a light source;
   a display panel illuminated by the light source and comprising an output face on which an image may be displayed; and
   an autostereoscopic filter having an input face of which is turned toward the output face of the display panel,
   wherein the autostereoscopic filter extends opposite only a portion of the output face of the display panel, and
   wherein an image plane offset panel is only provided in front of a remaining portion of the output face of the display panel not covered by the autostereoscopic filter.

2. The image generating device as claimed in claim 1, wherein the image plane offset panel is a fiber optic panel.

3. The image generating device as claimed in claim 1, wherein the image plane offset panel is located in contact with the output face of the display panel.

4. The image generating device as claimed in claim 1, wherein the autostereoscopic filter is located remotely from the output face of the display panel.

5. The image generating device as claimed in claim 1, wherein the autostereoscopic filter comprises a microlens array.

6. The image generating device as claimed in claim 1, wherein the image plane offset panel has a thickness which depends on characteristics of autostereoscopic filter.

7. The image generating device as claimed in claim 1, wherein the light source is a scanning unit and wherein the display panel is a diffuser an input face of which is illuminated by said scanning unit.

8. The image generating device as claimed in claim 1, wherein the display panel is a light modulator for spatially modulating the light emitted by the light source.

9. The image generating device as claimed in claim 8, wherein the light modulator comprises a transmissive screen an input face of which is turned toward the light source.

10. The image generating device as claimed in claim 1, further comprising an optically neutral element interposed between the output face of the display screen and the input face of the autostereoscopic filter.

11. A display screen for a motor vehicle passenger compartment, comprising:
    an open frame at a front of the motor vehicle passenger compartment;
    an image generating device set in the frame, wherein the image generating device comprises:
    a light source;
    a display panel illuminated by the light source and comprising an output face on which an image may be displayed; and
    an autostereoscopic filter having an input face of which is turned toward the output face of the display panel,
    wherein the autostereoscopic filter extends opposite only a portion of the output face of the display panel,
    wherein an image plane offset panel is only provided in front of a remaining portion of the output face of the display panel not covered by the autostereoscopic filter, and
    wherein the display panel is a light modulator for spatially modulating the light emitted by the light source;
    a computer for controlling the image generating device so that the image generating device generates an image; and
    a display screen of said image generating device, which closes the front opening of the frame.

12. A head-up display for a motor vehicle, comprising:
    an image generating device, wherein the image generating device comprises:
    a light source;
    a display panel illuminated by the light source and comprising an output face on which an image may be displayed; and
    an autostereoscopic filter having an input face of which is turned toward the output face of the display panel,
    wherein the autostereoscopic filter extends opposite only a portion of the output face of the display panel, and
    wherein an image plane offset panel is only provided in front of a remaining portion of the output face of the display panel not covered by the autostereoscopic filter;
    a computer for controlling the image generating device so that the image generating device generates an image; and
    a projection system for projecting said image into the field of vision of the driver of the motor vehicle.

13. The head-up display as claimed in claim 12, wherein said projection system comprises at least one optical magnification component.

14. The head-up display as claimed in claim 12, wherein said projection system comprises a combiner being in the form of a transparent and partially reflective optical glass.

15. The head-up display as claimed in claim 12, wherein said projection system comprises the windscreen of the motor vehicle, which is partially reflective.

* * * * *